United States Patent
Nakamura et al.

(10) Patent No.: US 7,355,809 B2
(45) Date of Patent: Apr. 8, 2008

(54) DISC DEVICE, DISK FORMATTING METHOD, AND DISK FORMATTING APPARATUS

(75) Inventors: Yoshihiko Nakamura, Kawasaki (JP); Takeshi Hara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/440,902

(22) Filed: May 25, 2006

(65) Prior Publication Data

US 2007/0183077 A1    Aug. 9, 2007

(30) Foreign Application Priority Data

Feb. 8, 2006 (JP) ............................ 2006-031573

(51) Int. Cl.
*G11B 21/02* (2006.01)

(52) U.S. Cl. ............................................. 360/75

(58) Field of Classification Search ............... None
See application file for complete search history.

(56) References Cited

U.S. PATENT DOCUMENTS

| | | | | |
|---|---|---|---|---|
| 5,596,458 A | | 1/1997 | Emo et al. | |
| 5,812,755 A | * | 9/1998 | Kool et al. | 714/8 |
| 6,137,644 A | * | 10/2000 | Hetzler et al. | 360/48 |
| 6,151,187 A | | 11/2000 | Ogawa | |
| 6,260,257 B1 | * | 7/2001 | Emo et al. | 29/603.09 |
| 6,977,791 B2 | * | 12/2005 | Zhu et al. | 360/75 |
| 7,012,771 B1 | * | 3/2006 | Asgari et al. | 360/31 |

FOREIGN PATENT DOCUMENTS

| | | |
|---|---|---|
| JP | 8-255412 | 10/1996 |
| JP | 11-66776 | 3/1999 |

* cited by examiner

*Primary Examiner*—K. Wong
(74) *Attorney, Agent, or Firm*—Greer, Burns & Crain, Ltd.

(57) ABSTRACT

A disk device includes a plurality of recording surfaces each of which having a recording area for recording data. An area or a width in a radial direction of an effective area set to be capable of recording the data in the recording area on at least one of the recording surfaces is different from that in the recording area on other of the recording surfaces.

11 Claims, 7 Drawing Sheets

INNERMOST AREA POSITION OF HEAD POSITIONING ACCURACY REFERENCE
[1] UPPER DISK/LOWER SURFACE
[2] UPPER DISK/UPPER SURFACE
[3] LOWER DISK/UPPER SURFACE
[4] LOWER DISK/LOWER SURFACE

FIG.4

| | | TPI/BPI DISTRIBUTION METHOD [Gx] | | | | | |
|---|---|---|---|---|---|---|---|
| | | G1 | G2 | G3 | · | · | Gn |
| DISK USE AREA [Ax] | A1 | F11 | F12 | F13 | · | · | F1n |
| | A2 | F21 | F22 | F23 | · | · | F2n |
| | A3 | F31 | F32 | F33 | · | · | F3n |
| | A4 | F41 | F42 | F43 | · | · | F4n |
| | · | · | · | · | · | · | · |
| | · | · | · | · | · | · | · |
| | An | Fn1 | Fn2 | Fn3 | · | · | Fnn |

DISC DEVICE, DISK FORMATTING METHOD, AND DISK FORMATTING APPARATUS

BACKGROUND OF THE INVENTION

1. Field of the Invention

The present invention relates to a disk device including a plurality of recording surfaces that has a recording area for recording data, a disk formatting method, and a disk formatting apparatus, and more particularly, to a disk device that can use an appropriate area as an effective area for recording the data according to head positioning accuracies that are different between respective heads and improve a recording quality, a disk formatting method, and a disk formatting apparatus.

2. Description of the Related Art

A recording density of a hard disk drive (HDD) is improved year by year to increase a recording capacity of the HDD. To improve the recording density, a further reduction in the width of a track on which data is recorded and a further reduction in flying height of heads used for writing and readout of the data are demanded. Therefore, in recent years, a head positioning accuracy is getting more and more susceptible to an influence of very small distortion of a disk surface.

Figure 7:
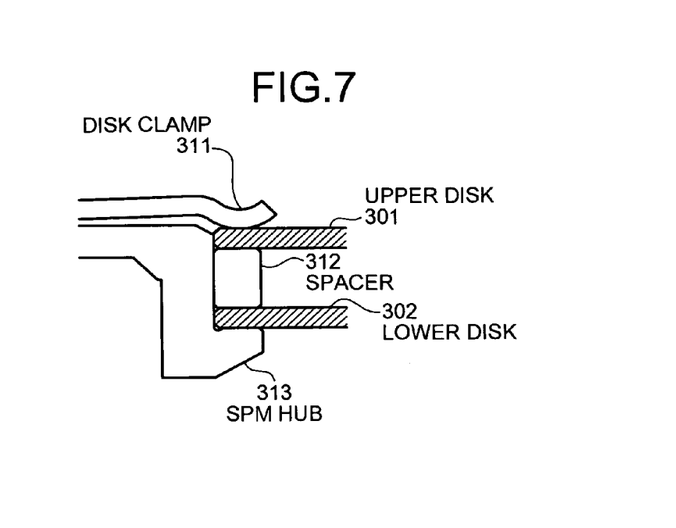
FIG. 7 is a side sectional view of a structure of a support member in the center of a disk surface.

FIG. 7 is a side sectional view of a structure of a support member in the center of a disk surface. As shown in the figure, a disk device has two disks, an upper disk 301 and a lower disk 302. The lower disk 302 is supported by a spacer 312 and a spindle motor (SPM) hub 313, both of which are planar components. On the other hand, the upper surface of the upper disk 301 is supported by a disk clamp 311, which is a component having a curved surface. Therefore, very small distortion tends to occur in the upper surface of the upper disk 301 compared with the lower disk 302. Very small distortion also tends to occur in the lower surface of the upper disk 301 on the opposite side of the upper surface because of the influence of the disk clamp 311.

In a conventional HDD, an innermost area position, which is a boundary on the inner side of a disk use area used for data recording, is set in a position offset to the outer side by a fixed amount from an inner side stopper position, which is a limit position that the heads can seek. When the innermost area position is determined based on an actuator stroke in this way, the innermost area position is basically a position identical for all the heads.

Figure 8:
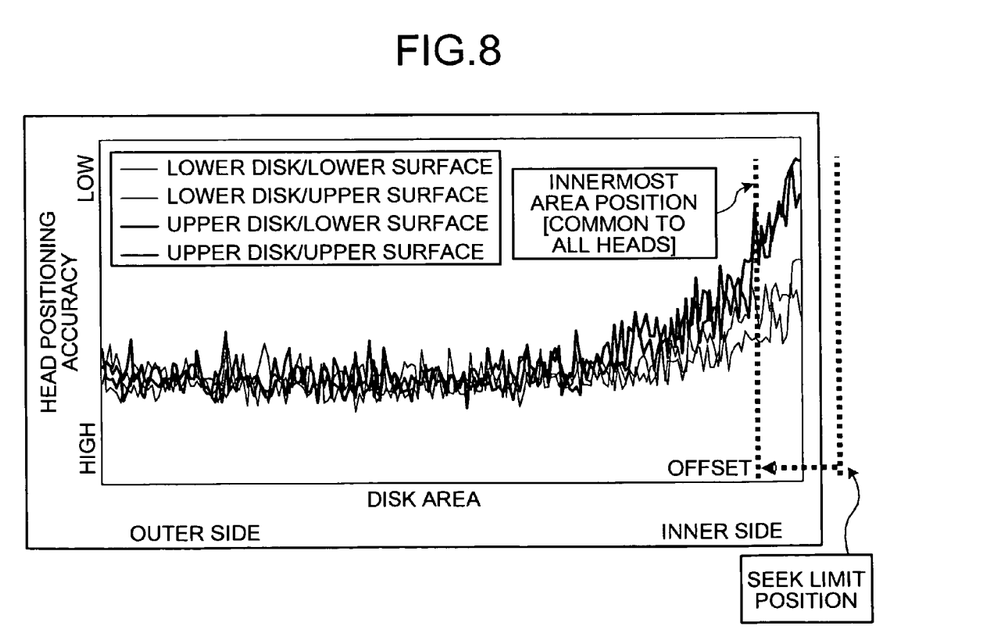
FIG. 8 is a diagram for explaining a difference of head positioning accuracies between heads.

FIG. 8 is a diagram for explaining a difference of head positioning accuracies between heads. As shown in the figure, in the disk device having the two disks, because of the difference of the spaces of the members that support the respective disk surfaces shown in FIG. 7, a head positioning accuracy in the upper disk 301 is low compared with that in the lower disk 302. The difference is more marked further on the inner side of the disks. Therefore, in the conventional method of determining an innermost area position based on an actuator stroke, a head positioning accuracy near the innermost area position of the upper disk is excessively deteriorated to cause deterioration in a recording quality.

A disk formatting method of dividing a disk use area into a plurality of zones and setting different track pitches (data recording densities in a disk radial direction) or readout/writing frequencies (data recording densities in a disk circumferential direction) in the respective zones divided is disclosed (see, for example, Japanese Patent Application Laid-Open No. H8-255412).

However, in the disk formatting method according to the conventional technology, an innermost area position is identical on an upper disk and a lower disk. Thus, when a head positioning accuracy is excessively deteriorated, a portion near the innermost area position of the upper disk is also included in the disk use area.

SUMMARY OF THE INVENTION

It is an object of the present invention to at least partially solve the problems in the conventional technology.

A disk device according to one aspect of the present invention includes a plurality of recording surfaces each of which having a recording area for recording data. An area or a width in a radial direction of an effective area set to be capable of recording the data in the recording area on at least one of the recording surfaces is different from that in the recording area on other of the recording surfaces.

A disk formatting method according to another aspect of the present invention is for a disk device including a plurality of recording surfaces each of which having a recording area for recording data and a plurality of heads that performs reading or writing of the data on the recording surfaces. The disk formatting method includes measuring a positioning accuracy of each of the for each of the heads recording surfaces; determining an effective area for recording the data for each of the heads based on a result of measurement of the positioning accuracy at the measuring; and executing formatting of a recording surface corresponding to each of the heads for the effective area determined for each of the heads.

A disk formatting apparatus according to still another aspect of the present invention is for a disk device including a plurality of recording surfaces each of which having a recording area for recording data and a plurality of heads that performs reading or writing of the data on the recording surfaces. The disk formatting apparatus includes a positioning-accuracy measuring unit that measures a positioning accuracy of each of the heads for each of the recording surfaces; an effective-area determining unit that determines an effective area for recording the data for each of the heads based on a result of measurement of the positioning accuracy by the positioning-accuracy measuring unit; and a format executing unit that executes formatting of a recording surface corresponding to each of the heads for the effective area determined for each of the heads.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
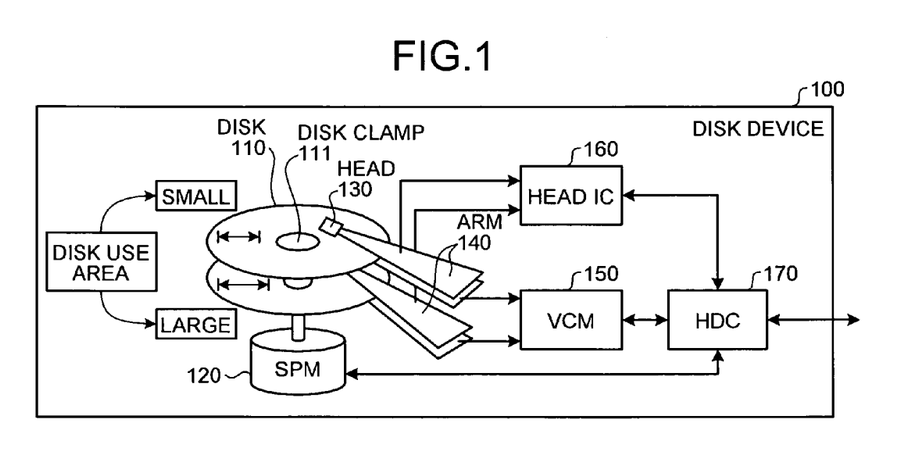
FIG. 1 is a hardware diagram of a constitution of a disk device according to a first embodiment of the present invention.

FIG. 1 is a hardware diagram of a constitution of a disk device 100 according to a first embodiment of the present invention. The disk device 100 is a magnetic disk device that magnetically records data. The disk device 100 includes disks 110, a spindle motor (SPM) 120, heads 130, arms 140, a voice coil motor (VCM) 150, a head integrated-circuit (IC) 160, and a hard disk controller (HDC) 170.

The disks 110 are boards of a disk shape that have magnetic recording surfaces on both front and rear surfaces. The disks 110 include two disks, an upper disk and a lower disk. The upper surface of the upper disk is supported by a disk clamp 111 that is a component having a curved surface. In the disk device 100 according to the first embodiment, as disk use areas used for recording on the disks 110, a disk use area on the upper disk is set smaller than that on the lower disk based on a difference of positioning accuracies between the heads due to the fact that the upper surface of the upper disk is supported by the disk clamp 111.

The SPM 120 is a driving device that rotates the disks 110. The heads 130 are magnetic heads that magnetically perform writing of data on and readout of data from magnetic recording surfaces of the disks 110. The arms 140 are support members that movably support the heads 130. Moving ranges to the inner side and the outer side thereof are limited by not-shown stoppers.

The VCM 150 is a driving device that operates the arms 140 to move the heads 130 to appropriate positions on the disks 110. The VCM 150 is also called an actuator. The head IC 160 is an IC for passing data read out from the heads 130 to the HDC 170 and writing data passed from the HDC 170 on the disks 110 using the heads 130. The HDC 170 is a control device that controls an operation of the entire disk device 100. The HDC 170 controls driving of the SPM 120 and the VCM 150, writing of data on the disks 110 from the heads 130, and readout of data from the disks 110 to the heads 130.

Figure 2:
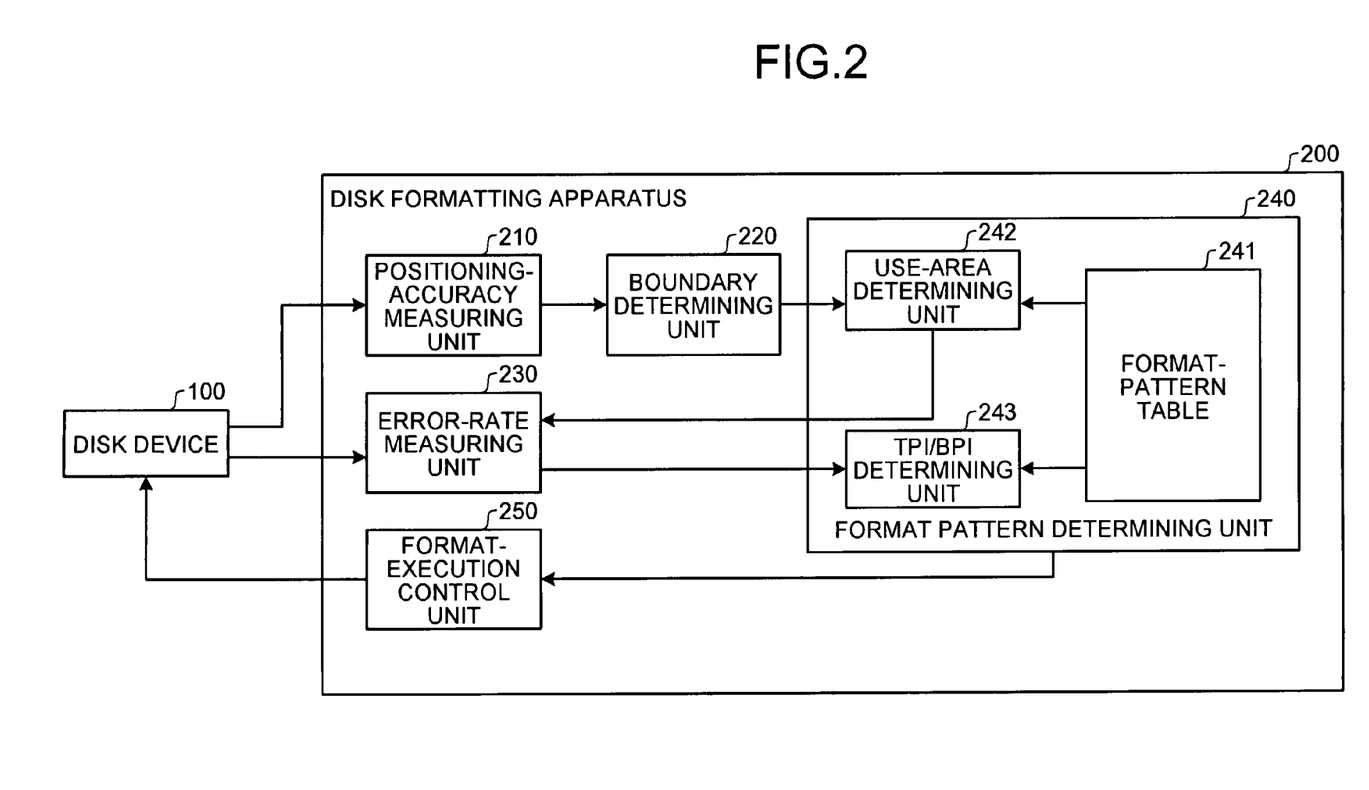
FIG. 2 is a functional block diagram of a constitution of a disk formatting apparatus according to the first embodiment.

A constitution of a disk formatting apparatus that formats the disk device 100 is explained. FIG. 2 is a functional block diagram of the constitution of the disk formatting apparatus according to the first embodiment. As shown in the figure, a disk formatting apparatus 200 is an apparatus for measuring a positioning accuracy of each of the heads 130 that the disk device 100 has for each of the recording surfaces and setting a disk use area for each of the heads based on a result of the measurement to format each of the recording surfaces. The disk formatting apparatus 200 includes a positioning-accuracy measuring unit 210, a boundary determining unit 220, an error-rate measuring unit 230, a format-pattern determining unit 240, and a format-execution control unit 250.

The positioning-accuracy measuring unit 210 is a processing unit that measures a positioning accuracy of each of the heads 130 over an entire range that the heads 130 can seek. The boundary determining unit 220 is a processing unit that determines an innermost area position, which is a boundary on the inner side of the disk use area, for each of the heads 130 based on the positioning accuracy of each of the heads 130 measured by the positioning-accuracy measuring unit 210.

Figure 3:
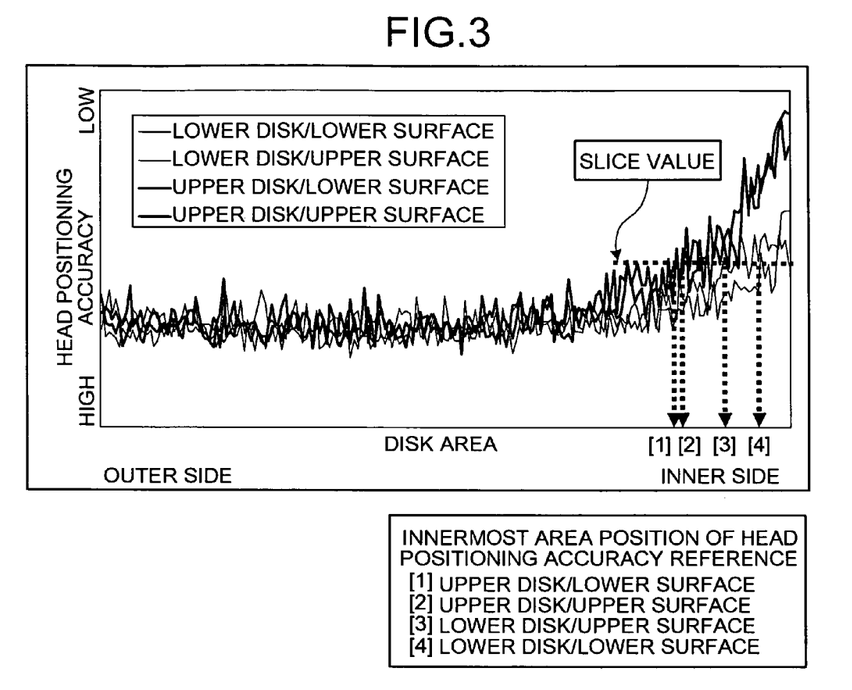
FIG. 3 is a diagram for explaining a method of determining an innermost area position based on a head positioning accuracy.

FIG. 3 is a diagram for explaining a method of determining an innermost area position based on a head positioning accuracy. A graph shown in the figure indicates a result of the measurement of a positioning accuracy of each of the heads measured by the positioning-accuracy measuring unit 210. In the figure, a positioning accuracy at the time of relatively low-speed rotation at about 4200 rpm is measured. In this case, the positioning accuracy is lower in an area closer to the inner side. In the figure, a difference of positioning accuracies between the heads is larger in an area closer to the inner side. The deterioration in a positioning accuracy is more marked in the upper disk (a graph of a bold line in the figure) than in the lower disk (a graph of a thin line in the figure).

Thus, the disk device 100 in the first embodiment sets an innermost area position for each of the heads based on this positioning accuracy. When the positioning accuracy is continuously measured from the outer side to the inner side, the boundary determining unit 220 of the disk formatting apparatus 200 determines a position where the positioning accuracy exceeds a predetermined slice value for the first time as an innermost area position in the head. In FIG. 3, the innermost area position determined for each of the heads is closer to the centers of the disks in an order of (1) the lower surface of the upper disk, (2) the upper surface of the upper disk, (3) the upper surface of the lower disk, and (4) the lower surface of the lower disk.

The upper disk of the two disks 110 is supported by the disk clamp 111 having a curved surface. Thus, in particular, a surface accuracy is low on the inner side compared with that of the lower disk. Therefore, when an innermost area position is determined based on a positioning accuracy, the innermost area position is closer to the outer side on the upper disk than on the lower disk. In the first embodiment, an outermost area position, which is a boundary on the outer side of the disk use areas, is set to be common to all the heads.

In this way, the positioning-accuracy measuring unit 210 measures a positioning accuracy of each of the heads and the boundary determining unit 220 determines an innermost area position for each of the heads based on a result of the measurement. Thus, it is possible to reduce a difference of positioning accuracies that occurs between the heads and obtain, in all the heads, a satisfactory positioning accuracy equal to or higher than a fixed level in the entire disk use area.

The error-rate measuring unit 230 is a processing unit that performs readout/writing of data in a disk use area set for each of the heads and measures an error rate that is a rate of occurrence of read/write errors in reading and writing the data. The error-rate measuring unit 230 writes noise while moving the heads in a direction approaching a measurement object track from tracks on both sides of the measurement object track and measures an error rate of the measurement object track to also measure a track-per-inch (TPI) margin.

The format-pattern determining unit 240 is a processing unit that determines a format pattern for each of the heads based on results of the measurements by the positioning-accuracy measuring unit 210 and the error-rate measuring unit 230. The format-pattern determining unit 240 includes a format-pattern table 241, a use-area determining unit 242, and a TPI/BPI determining unit 243.

The format-pattern table 241 is a table that stores information on a disk use area at the time when a disk is formatted and a method of distributing a TPI and a bit per inch (BPI) in the disk use area. The "TPI" indicates a track density in a disk radial direction and the "BPI" indicates a track recording density in a disk circumferential direction.

Figure 4:
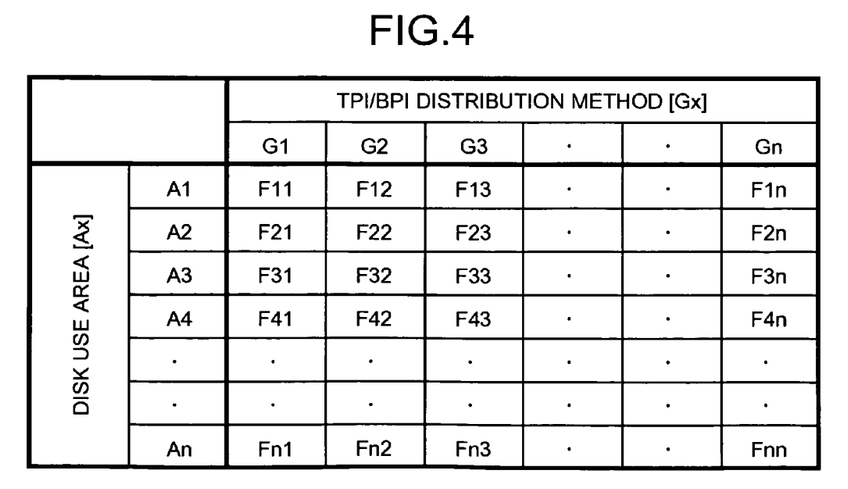
FIG. 4 is a diagram of an example of a format-pattern table.

FIG. 4 is a diagram of an example of the format-pattern table 241. As shown in the figure, in the format-pattern table 241, a disk use area Ax (A1 to An) and a TPI/BPI distribution method Gx (G1 to Gn) are set to determine a format pattern Fxx (F11 to Fnn).

The disk use area Ax in the vertical direction indicates an area in which formatting of disks is executed. The disk use area Ax is determined based on an innermost area determined by the boundary determining unit 220. In the first embodiment, an outermost area position is common to all the heads and only an innermost area position is variable. Thus, when the innermost area position is determined by the boundary determining unit 220, a disk use area is decided.

The TPI/BPI distribution method Gx in the horizontal direction indicates a method of distributing, when a disk use area is divided into twenty-seven zones, a TPI and a BPI for each of the zones. As the method of distributing a TPI and a BPI for each of the zones, a total volume on one surface of recordable data is set to be identical in all the format patterns Fxx. It is possible to change, by setting a different TPI and BPI for each of the zones, the method of distributing a TPI and a BPI for each of the zones.

The TPI/BPI distribution method Gx is determined based on results of measurement of an error rate and a TPI margin by the error-rate measuring unit 230. The TPI, which is a track density in a disk radial direction, is determined based on a result of the measurement of a TPI margin by the error-rate measuring unit 230. The BPI, which is a track recording density in a disk circumferential direction, is determined based on a result of the measurement of an error rate by the error-rate measuring unit 230 at the time when positions in the disk radial direction of the heads are fixed.

In the format-pattern table 241, a TPI and a BPI of each of the zones are set such that a total recording capacity in a disk use area is identical in all the format patterns Fxx.

The use-area determining unit 242 is a processing unit that determines a row of the disk use area Ax in the format-pattern table 241 based on a result of determination of an innermost area position by the boundary determining unit 220. The TPI/BPI determining unit 243 is a processing unit that determines a column of the TPI/BPI distribution method Gx in the format-pattern table 241 based on a result of the measurement of an error rate and a TPI margin by the error-rate measuring unit 230. The format pattern Fxx is determined for each of the heads by the use-area determining unit 242 and the TPI/BPI determining unit 243.

The format-execution control unit 250 is a processing unit that controls a format of the disks 110 for each of the heads based on a format pattern determined by the format-pattern determining unit 240.

Figure 5:
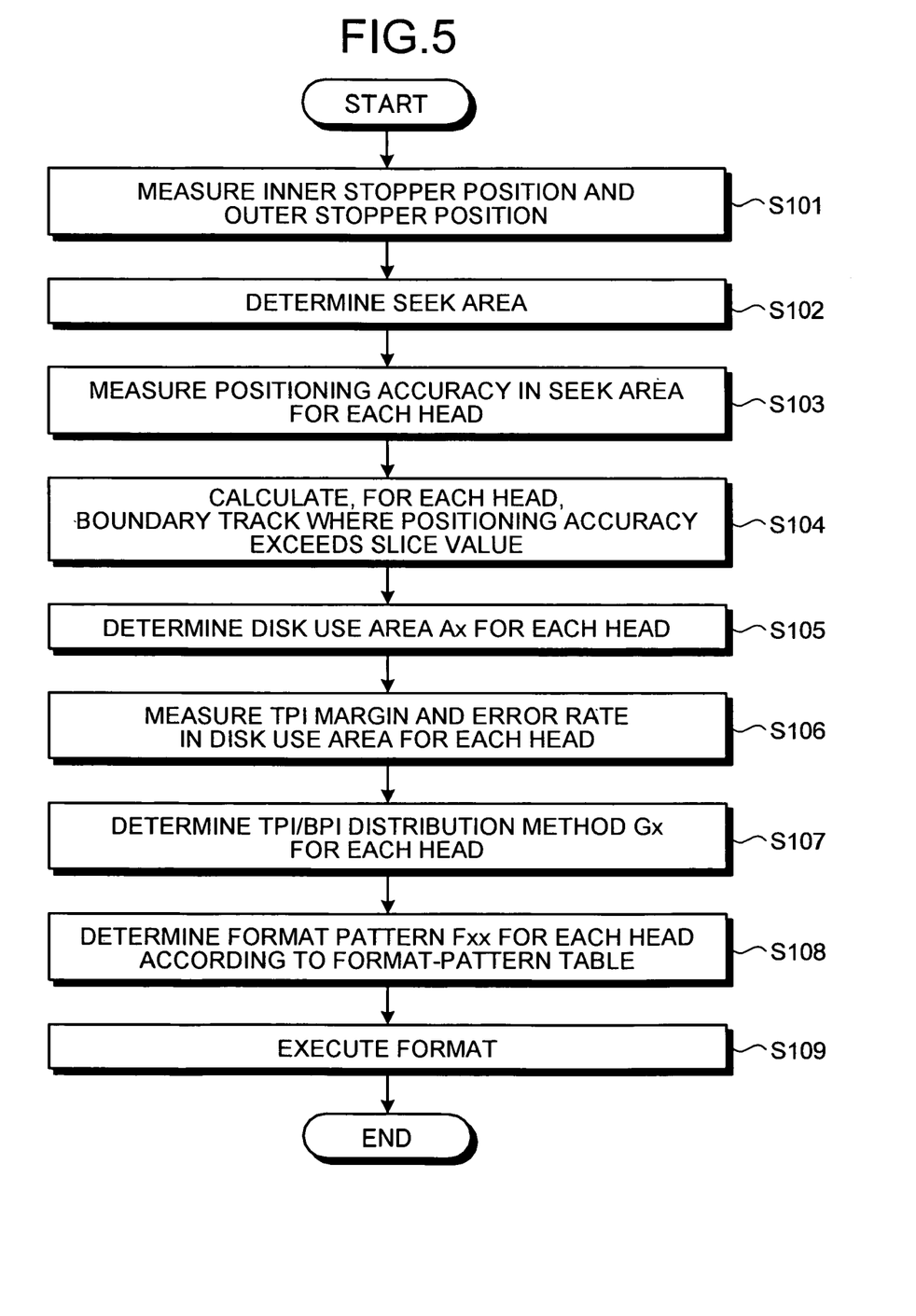
FIG. 5 is a flowchart of a processing procedure of disk format processing executed by the disk formatting apparatus.

FIG. 5 is a flowchart of a processing procedure of disk format processing executed by the disk formatting apparatus 200. The positioning-accuracy measuring unit 210 measures the inner side stopper position and the outer side stopper position of the arms 140 at the time when the heads 130 are moved (step S101) and determines a seek area having the two stopper positions at both ends (step S102). Concerning the outer side, instead of the outer side stopper position, a position of a ramp mechanism provided on the outer side of the disk 110 to retract the heads 130 may be measured.

The positioning-accuracy measuring unit 210 measures a positioning accuracy in the seek area for each of the heads (step S103). The boundary determining unit 220 calculates, based on a result of the measurement, a track that is a boundary where a positioning accuracy exceeds a slice value and determines an innermost area position for each of the heads (step S104).

The use-area determining unit 242 of the format-pattern determining unit 240 determines a disk use area Ax based on a result of determination by the boundary determining unit 220 with reference to the format-pattern table 241 (step S105).

Thereafter, the error-rate measuring unit 230 measures an error rate and a TPI margin in the disk use area Ax determined by the use-area determining unit 242 (step S106). The TPI/BPI determining unit 243 of the format-pattern determining unit 240 determines an appropriate TPI/BPI distribution method Gx with reference to the format-pattern table 241 (step S107).

The format-pattern determining unit 240 determines a format pattern Fxx based on the disk use area Ax determined by the use-area determining unit 242 and the TPI/BPI distribution method Gx determined by the TPI/BPI determining unit 243 (step S108).

Thereafter, the format-execution control unit 250 controls formatting for each of disk surfaces of the disk device 100 based on the format pattern Fxx determined by the format-pattern determining unit 240 (step S109) and ends the disk format processing.

In this case, an innermost area position on the upper disk is set in a position closer to the outer side than an innermost area position on the lower disk. Thus, a disk use area is set smaller for the upper disk than for the lower disk. For example, in the example shown in FIG. 3, a disk use area on the lower surface of the upper disk is the smallest and a disk use area on the lower surface of the lower disk is the largest.

In this way, the positioning-accuracy measuring unit 210 measures a positioning accuracy of each of the heads and the boundary determining unit 220 determines an innermost area position for each of the heads based on a result of the measurement to vary a width in a radial direction of a disk use area for each of the heads. Thus, it is possible to obtain, in all the heads, a satisfactory positioning accuracy equal to or higher than a fixed level in the entire area of the disk use area.

The format-pattern determining unit 240 applies the format-pattern table 241 to the entire disk use area determined by the boundary determining unit 220. However, the format-pattern determining unit 240 may apply the format-pattern table 241 only to a part of the areas where a positioning accuracy is slightly low and uniformly set a TPI/BPI distribution method for the other areas where a positioning accuracy is satisfactory. Thus, a disk formatting method of applying the format-pattern table 241 to a part of a disk use area is explained.

In the following explanation, for convenience of explanation, an area to which the format-pattern table 241 is not applied and for which the TPI/BPI distribution method is fixed is called a "fixed TPI area". An area to which the format-pattern table 241 is applied and for which the TPI/BPI distribution method is set variable is called a "variable TPI area".

The boundary determining unit 220 determines a boundary position of the fixed TPI area and the variable TPI area other than the determination of an innermost area position. As a method of determining the boundary position, a method similar to the method of determining an innermost area position is used. The boundary determining unit 220 uses a slice value (a second slice value) smaller than a predetermined slice value (a first slice value) used for determination of an innermost area position. When a positioning accuracy is continuously measured from the outer side to the inner side, the boundary determining unit 220 determines a position where the positioning accuracy exceeds the second slice value for the first time as a boundary position of the fixed TPI area and the variable TPI area in the head.

The format-pattern determining unit 240 sets an area further on the outer side than the boundary position determined as the fixed TPI area and sets an area further on the inner side than the boundary position as the variable TPI area to determine a format pattern. In this case, as described above, in the format-pattern table 241 shown in FIG. 4, a TPI and a BPI for each of the zones are set such that, in all the format patterns Fxx, a total volume of recordable data is identical on one surface including the fixed TPI area and the variable TPI area.

For example, in a head "Head 0" corresponding to the upper surface of the upper disk, the boundary determining unit 220 sets an innermost area position R0(in) and sets a boundary position R0 to which the format-pattern table 241 is applied. The format-pattern determining unit 240 sets an area R(out) to R0 further on the outer side than the boundary position R0 as the fixed TPI area and sets an area R0 to R0(in) further on the inner side than the boundary position R0 as the variable TPI area. In the first embodiment, an outermost area position R(out) is a position common to all the heads.

Similarly, for other heads "Head 1" to "Head 3", the boundary determining unit 220 sets innermost area positions R1(in) to R3(in) and boundary positions R1 to R3 to which the format-pattern table 241 is applied. The boundary determining unit 220 sets the fixed TPI area and the variable TPI area as shown in Table 1 below.

TABLE 1

|  | Fixed TPI area | Variable TPI area |
| --- | --- | --- |
| Head 0 | R(out) to R0 | R0 to R0(in) |
| Head 1 | R(out) to R1 | R1 to R1(in) |
| Head 2 | R(out) to R2 | R2 to R2(in) |
| Head 3 | R(out) to R3 | R3 to R3(in) |

In this way, the positioning-accuracy measuring unit 210 measures a positioning accuracy of each of the heads and the boundary determining unit 220 determines an innermost area position and a boundary position of the fixed TPI area and the variable TPI area for each of the heads based on a result of the measurement. Thus, it is possible to reduce a difference of positioning accuracies between the heads in an area near a boundary on the inner side where the difference is marked.

The format-pattern determining unit 240 may set, as shown in Table 2 below, a uniform TPI/BPI distribution method ("TPI 0" to "TPI 3") for the entire disk use area determined by the boundary determining unit 220 according to the innermost area positions R0(in) to R3(in) determined for each of the heads without applying a format-pattern table to the disk use area.

TABLE 2

|  | Disk use area | TPI/BPI distribution method |
| --- | --- | --- |
| Head 0 | R(out) to R0(in) | TPI0 |
| Head 1 | R(out) to R1(in) | TPI1 |
| Head 2 | R(out) to R2(in) | TPI2 |
| Head 3 | R(out) to R3(in) | TPI3 |

In this way, the format-pattern determining unit 240 uniformly sets a TPI and a BPI for the entire disk use area according to an innermost area position determined for each of the heads. Thus, it is possible to set a TPI and a BPI corresponding to a different positioning accuracy of each of the heads without following a complicated procedure.

As described above, according to the first embodiment, an area or a width in a radial direction of an effective area (a disk use area) set to be capable of recording data in a recording area of at least one recording surface is different from areas or widths in a radial direction of effective areas set to be capable of recording data in recording areas of the other recording surfaces. Thus, it is possible to use appropriate areas as effective areas used for recording of data according to head positioning accuracies that are different between respective heads and improve a recording quality.

Moreover, according to the first embodiment, the effective area-is determined based on positioning accuracies of heads that perform readout or writing of data. Thus, it is possible to obtain, in all the heads, a satisfactory positioning accuracy equal to or higher than a fixed level in the entire effective area and improve a recording quality.

Furthermore, according to the first embodiment, the effective area is divided into a plurality of zones and a TPI and a BPI in at least one of the zones are set to be different from those in the other zones. Thus, it is possible to set an appropriate recording density corresponding to a head positioning accuracy that changes depending on a place of a disk and improve a recording quality.

Moreover, according to the first embodiment, an area near a boundary on the inner side of the effective area is divided into a plurality of zones and a TPI and a BPI in at least one of the zones are set to be different from those in the other zones. Thus, it is possible to reduce a difference of positioning accuracies between the heads in areas where the difference is marked and efficiently improve a recording quality by limiting areas in which a recording density is variable to a part of the areas.

Furthermore, according to the first embodiment, a TPI and a BPI are determined for each of the recording surfaces according to a boundary on the inner side in each of the effective areas. Thus, there is an effect that it is possible to set a recording density corresponding to a different positioning accuracy of each of the heads without following a complicated procedure.

Moreover, according to the first embodiment, the positioning-accuracy measuring unit 210 measures a positioning accuracy of each of the heads that the disk device has for each of the recording surfaces. The boundary determining unit 220 determines an effective area used for recording of data for each of the heads based on a result of the measurement of a positioning accuracy. The format-execution control unit 250 executes, for the effective area determined for each of the heads, formatting of the recording surface corresponding to each of the heads. Thus, it is possible to obtain, in all the heads, a satisfactory positioning accuracy equal to or higher than a fixed level in the entire effective area and improve a recording quality.

Furthermore, according to the first embodiment, the format-pattern determining unit 240 divides an effective area determined for each of the heads into a plurality of zones and determines a TPI and a BPI in at least one of the zones to be different from those in the other zones. The format-execution control unit 250 executes formatting of the recording surface corresponding to each of the heads based on the TPI and the BPI for each of the heads determined. Thus, it is possible to set an appropriate recording density corresponding to a head positioning accuracy that changes depending on a place of a disk and improve a recording quality.

Moreover, according to the first embodiment, the format-pattern determining unit 240 divides an area near a boundary on the inner side of the effective area determined for each of the heads into a plurality of zones and determines a TPI and a BPI in at least one of the zones to be different from those in the other zones. The format-execution control unit 250 executes formatting of the recording surface corresponding to each of the heads based on the TPI and the BPI for each of the heads determined. Thus, it is possible to reduce a difference of positioning accuracies between the heads in areas where the difference is marked and efficiently improve a recording quality by limiting areas in which a recording density is variable to a part of the areas.

Furthermore, according to the first embodiment, the format-pattern determining unit 240 determines a TPI and a BPI for each of the recording surfaces according to a boundary on the inner side of the effective areas. The format-execution control unit 250 executes formatting of the recording surface corresponding to each of the heads based on the TPI and the BPI for each of the heads determined. Thus, it is possible to set a recording density corresponding to a different positioning accuracy of each of the heads without following a complicated procedure.

According to the first embodiment, a track that is a boundary on the inner side is calculated based on positioning accuracies of the heads and an innermost area position is variably determined. However, when the disks rotate at high speed, a difference may occur in positioning accuracies between the heads on the outer side because of influences of suspension vibration and disk flutter due to wind disturbances. Thus, in a second embodiment of the present invention, a track that is a boundary on the outer side is calculated based on positioning accuracies and an outermost area position is variably determined.

The disk formatting apparatus 200 according to the second embodiment is different from the disk formatting apparatus 200 according to the first embodiment in that the boundary determining unit 220 and the format-pattern determining unit 240 determine a boundary and a format pattern, respectively, based on positioning accuracies on the outer side. Otherwise, the disk formatting apparatus 200 is the same as the disk formatting apparatus 200 according to the first embodiment. The disk device 100 is the same as the disk device 100 according to the first embodiment. For convenience of explanation, functional units that perform the same functions as those shown in FIGS. 1 and 2 are denoted by the identical reference numerals. Detailed explanations of the units are omitted.

Figure 6A:
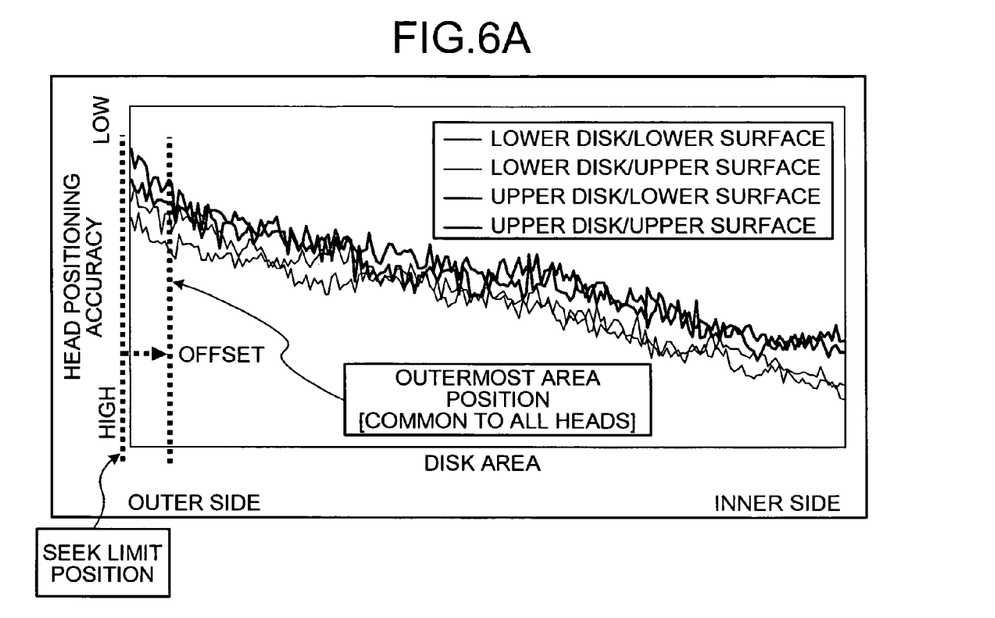
FIG. 6A is a diagram for explaining a difference of head positioning accuracies between heads on the outer side at the time of high-speed rotation.

FIG. 6A is a diagram for explaining a difference of head positioning accuracies between the heads on the outer side at the time of high-speed rotation. As shown in the figure, when the disks rotate at high speed, contrary to the case shown in FIG. 8, positioning accuracies of the heads are lower in a position closer to the outer side. In the conventional disk device, an outermost area position that is a boundary on the outer side of a disk use area is also set, in all the heads, as a position offset to the inner side by some degree from the seek limit position of the heads. Thus, a difference also occurs between the heads concerning positioning accuracies around the outermost area position.

Figure 6B:
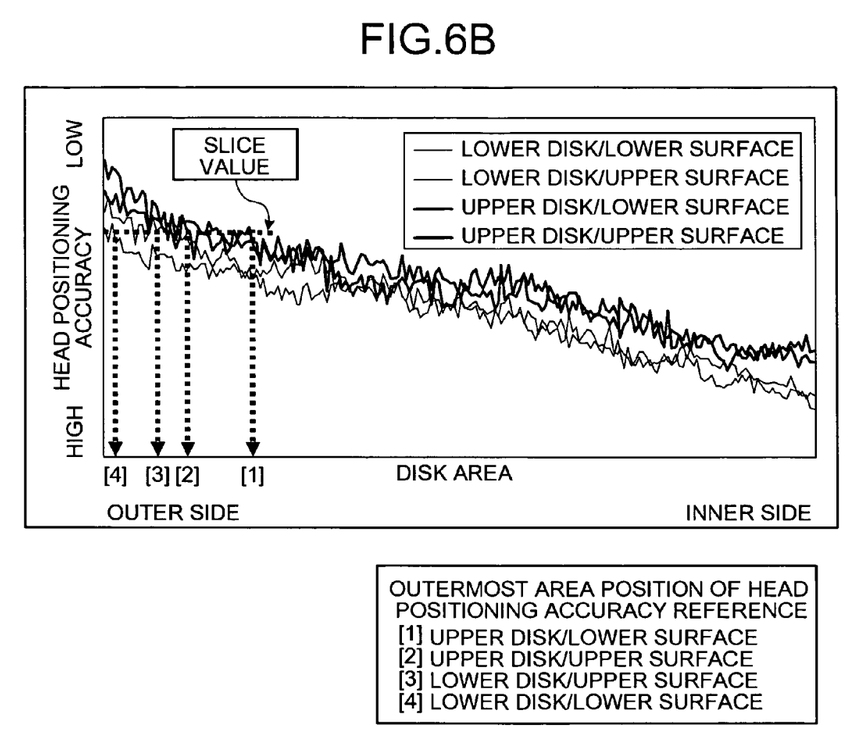
FIG. 6B is a diagram for explaining a method of determining an outermost area position based on a head positioning accuracy.

Thus, the boundary determining unit 220 in the second embodiment determines an outermost area position for each of the heads based on a positioning accuracy on the outer side. FIG. 6B is a diagram for explaining a method of determining an outermost area position based on a head positioning accuracy. As shown in the figure, when a positioning accuracy in a certain head is continuously measured from the outer side to the inner side, a position where the positioning accuracy exceeds a predetermined slice value for the first time is determined as an outermost area position in the head. In the figure, the outermost area position is more distant from the centers of the disks in an order of (1) the lower surface of the upper disk, (2) the upper surface of the upper disk, (3) the upper surface of the lower disk, and (4) the lower surface of the lower disk.

A processing procedure of disk format processing executed by the disk formatting apparatus 200 according to the second embodiment is the same as that in the first embodiment. Thus, detailed explanations of the processing procedure are omitted.

In this way, the positioning-accuracy measuring unit 210 measures a positioning accuracy of each of the heads and the boundary determining unit 220 determines an outermost area position for each of the heads based on a result of the measurement and varies a width in a radial direction of a disk use area for each of the heads. Thus, it is possible to obtain, in all the heads, a satisfactory positioning accuracy equal to or higher than a fixed level in the entire disk use area.

As in the first embodiment, the format-pattern determining unit 240 may apply the format-pattern table 241 only to a part of the areas where a positioning accuracy is slightly low and uniformly set a TPI/BPI distribution method for the other areas where a positioning accuracy is satisfactory instead of applying the format-pattern table 241 for the entire disk use area determined.

In this case, in a head "Head 0" corresponding to the upper surface of the upper disk, the boundary determining unit 220 determines an outermost area position R0(out) and determines a boundary position R0 to which the format-pattern table 241 is applied. The format-pattern determining unit 240 sets an area R0(out) to R0 further on the outer side than the boundary position R0 as the variable TPI area and sets an area R0 to R(in) further on the inner side than the boundary position R0 as the fixed TPI area. The format-pattern determining unit 240 sets, for the other heads, boundaries to which the format-pattern table 241 is applied in the same manner. In the second embodiment, an innermost area position R(in) is a position common to all the heads.

Similarly, for other heads "Head 1" to "Head 3", the format-pattern determining unit 240 sets outermost area positions R1(out) to R3(out) and boundary positions R1 to R3 to which the format-pattern table 241 is applied and sets the fixed TPI area and the variable TPI area as shown in Table 3.

TABLE 3

|  | Variable TPI area | Fixed TPI area |
|---|---|---|
| Head 0 | R0(out) to R0 | R0 to R(in) |
| Head 1 | R1(out) to R1 | R1 to R(in) |
| Head 2 | R2(out) to R2 | R2 to R(in) |
| Head 3 | R3(out) to R3 | R3 to R(in) |

In this way, the positioning-accuracy measuring unit 210 measures a positioning accuracy of each of the heads and the boundary determining unit 220 determines an outermost area position and a boundary position of the fixed TPI area and the variable TPI area for each of the heads based on a result of the measurement. Thus, it is possible to reduce a difference of positioning accuracies between the heads in an area near a boundary on the outer side where the difference is marked.

The format-pattern determining unit 240 may set, as shown in Table 4, a uniform TPI/BPI distribution method ("TPI 0" to "TPI 3") for the entire disk use area determined by the boundary determining unit 220 according to the outermost area positions R0(out) to R3(out) determined for each of the heads without applying a format-pattern table to the disk use area.

TABLE 4

|  | Disk use area | TPI/BPI distribution method |
|---|---|---|
| Head 0 | R0(out) to R(in) | TPI0 |
| Head 1 | R1(out) to R(in) | TPI1 |
| Head 2 | R2(out) to R(in) | TPI2 |
| Head 3 | R3(out) to R(in) | TPI3 |

In this way, the format-pattern determining unit 240 uniformly sets a TPI and a BPI for the entire disk use area according to an outermost area position determined for each of the heads. Thus, it is possible to set a TPI and a BPI corresponding to a different positioning accuracy of each of the heads without following a complicated procedure.

As described above, according to the second embodiment, an area or a width in a radial direction of an effective area (a disk use area) set to be capable of recording data in a recording area of at least one recording surface is different from areas or widths in a radial direction of effective areas set to be capable of recording data in recording areas of the other recording surfaces. Thus, it is possible to use appropriate areas as effective areas used for recording of data according to head positioning accuracies that are different between respective heads and improve a recording quality.

Moreover, according to the second embodiment, the effective area is determined based on positioning accuracies of heads that perform readout or writing of data. Thus, it is possible to obtain, in all the heads, a satisfactory positioning accuracy equal to or higher than a fixed level in the entire effective area and improve a recording quality.

Furthermore, according to the second embodiment, the effective area is divided into a plurality of zones and a TPI and a BPI in at least one of the zones are set to be different from those in the other zones. Thus, it is possible to set an appropriate recording density corresponding to a head positioning accuracy that changes depending on a place of a disk and improve a recording quality.

Moreover, according to the second embodiment, an area near a boundary on the outer side of the effective area is divided into a plurality of zones and a TPI and a BPI in at least one of the zones are set to be different from those in the other zones. Thus, it is possible to reduce a difference of positioning accuracies between the heads in areas where the difference is marked and efficiently improve a recording quality by limiting areas in which a recording density is variable to a part of the areas.

Furthermore, according to the second embodiment, a TPI and a BPI are determined for each of the recording surfaces according to a boundary on the outer side in each of the effective areas. Thus, there is an effect that it is possible to set a recording density corresponding to a different positioning accuracy of each of the heads without following a complicated procedure.

Moreover, according to the second embodiment, the positioning-accuracy measuring unit 210 measures a positioning accuracy of each of the heads that the disk device has for each of the recording surfaces. The boundary determining unit 220 determines an effective area used for recording of data for each of the heads based on a result of the measurement of a positioning accuracy. The format-execution control unit 250 executes, for the effective area determined for each of the heads, formatting of the recording surface corresponding to each of the heads. Thus, it is possible to obtain, in all the heads, a satisfactory positioning accuracy equal to or higher than a fixed level in the entire effective area and improve a recording quality.

Furthermore, according to the second embodiment, the format-pattern determining unit 240 divides an effective area determined for each of the heads into a plurality of zones and determines a TPI and a BPI in at least one of the zones to be different from those in the other zones. The format-execution control unit 250 executes formatting of the recording surface corresponding to each of the heads based on the TPI and the BPI for each of the heads determined. Thus, it is possible to set an appropriate recording density corresponding to a head positioning accuracy that changes depending on a place of a disk and improve a recording quality.

Moreover, according to the second embodiment, the format-pattern determining unit 240 divides an area near a boundary on the outer side of the effective area determined for each of the heads into a plurality of zones and determines a TPI and a BPI in at least one of the zones to be different from those in the other zones. The format-execution control unit 250 executes formatting of the recording surface corresponding to each of the heads based on the TPI and the BPI for each of the heads determined. Thus, it is possible to reduce a difference of positioning accuracies between the heads in areas where the difference is marked and efficiently improve a recording quality by limiting areas in which a recording density is variable to a part of the areas.

Furthermore, according to the second embodiment, the format-pattern determining unit 240 determines a TPI and a BPI for each of the recording surfaces according to a boundary on the outer side of the effective areas. The format-execution control unit 250 executes formatting of the recording surface corresponding to each of the heads based on the TPI and the BPI for each of the heads determined. Thus, it is possible to set a recording density corresponding to a different positioning accuracy of each of the heads without following a complicated procedure.

The disk device 100 and the disk formatting apparatus 200 according to the first and the second embodiments have been explained. However, it is possible to carry out the present invention in various different forms other than the embodiments described above. Thus, the various different embodiments are explained below as the disk device 100 and the disk formatting apparatus 200 according to a third embodiment of the present invention.

For example, according to the first and the second embodiments, the boundary determining unit 220 determines only an innermost area position or an outermost area position for each of the heads based on positioning accuracies of the heads measured by the positioning-accuracy measuring unit 210. However, the boundary determining unit 220 may determine both an innermost area position and an outermost area position for each of the heads.

In this way, the positioning-accuracy measuring unit 210 measures a positioning accuracy of each of the heads and the boundary determining unit 220 determines an innermost area position and an outermost area position for each of the heads based on a result of the measurement to vary a width in a radial direction of a disk use area for each of the heads. Thus, it is possible to obtain, in all the heads, a satisfactory positioning accuracy equal to or higher than a fixed level in the entire disk use area.

The boundary determining unit 220 may apply the format-pattern table 241 only to areas near the innermost area position and the outermost area position where a positioning accuracy is slightly low and uniformly set a TPI/BPI distribution method for the other areas where a positioning accuracy is satisfactory instead of applying the format-pattern table 241 for the entire disk use area determined. The boundary determining unit 220 sets different innermost area positions R0(in) to R3(in) and different outermost area positions R0(out) to R3(out) for each of the heads. The boundary determining unit 220 also sets, concerning boundary positions to which the format-pattern table 241 is applied, both boundary positions R0(in') to R3(in') near the innermost area positions and boundary positions R0(out') to R3(out') near the outermost area positions. The boundary determining unit 220 sets the fixed TPI area and the variable TPI are as shown in Table 5.

TABLE 5

|  | Variable TPI area | Fixed TPI area | Variable TPI area |
|---|---|---|---|
| Head 0 | R0(out) to R0(out') | R0(out') to R0(in') | R0(in') to R0(in) |
| Head 1 | R1(out) to R1(out') | R1(out') to R1(in') | R1(in') to R1(in) |
| Head 2 | R2(out) to R2(out') | R2(out') to R2(in') | R2(in') to R2(in) |
| Head 3 | R3(out) to R3(out') | R3(out') to R3(in') | R3(in') to R3(in) |

In this way, the positioning-accuracy measuring unit 210 measures a positioning accuracy of each of the heads and the boundary determining unit 220 determines an innermost area position, an outermost area position, and a boundary position of the fixed TPI area and the variable TPI area based on a result of the measurement. Thus, it is possible to reduce a difference of positioning accuracies between the heads in an area near a boundary on the inner side and an area near a boundary on the outer side where the difference is marked.

The format-pattern determining unit 240 may set a uniform TPI/BPI distribution method ("TPI 0" to "TPI 3") as shown in Table 6 according to the innermost area positions R0(in) to R3(in) and the outermost area positions R0(out) to R3(out) determined for each of the heads without applying a format-pattern table to the entire disk use area determined by the boundary determining unit 220.

TABLE 6

|  | Disk use area | TPI/BPI distribution method |
|---|---|---|
| Head 0 | R0(out) to R0(in) | TPI0 |
| Head 1 | R1(out) to R1(in) | TPI1 |
| Head 2 | R2(out) to R2(in) | TPI2 |
| Head 3 | R3(out) to R3(in) | TPI3 |

In this way, the format-pattern determining unit 240 uniformly sets a TPI and a BPI for the entire disk use area according to the innermost area position and the outermost area position determined for each of the heads. Thus, it is possible to set a TPI and a BPI corresponding to a different positioning accuracy of each of the heads without following a complicated procedure.

According to the first and the second embodiments, a different TPI/BPI distribution method is set for each of the heads. However, it is also possible that a TPI/BPI distribution method is common to all the heads and only an innermost area position or an outermost area position is varied between the heads according to a head positioning accuracy. For example, when the boundary determining unit 220 determines an innermost area position R0(in) in a head "Head 0" corresponding to the upper surface of the upper disk based on a head positioning accuracy, the format-pattern determining unit 240 applies the TPI/BPI distributing method common to all the heads starting from this innermost area position and determines a position where a predetermined recording capacity is obtained as an outermost area position R0(out). Concerning the other heads, the format-pattern determining unit 240 determines innermost area positions R1(in) to R3(in) and outermost area positions R1(out) to R3(out) in the same manner and sets a disk use area and a TPI/BPI distribution method as shown in Table 7.

TABLE 7

|  | Disk use area | TPI/BPI distribution method |
|---|---|---|
| Head 0 | R0(out) to R0(in) | Fixed TPI |
| Head 1 | R1(out) to R1(in) | Fixed TPI |
| Head 2 | R2(out) to R2(in) | Fixed TPI |
| Head 3 | R3(out) to R3(in) | Fixed TPI |

Conversely, when the boundary determining unit 220 determines outermost area positions R0(out) to R3(out) of each of the heads based on a head positioning accuracy, the format-pattern determining unit 240 may apply the TPI/BPI distribution method common to all the heads starting from the outermost area positions and determine positions where a predetermined recording capacity is obtained as innermost area positions R0(in) to R3(in).

In this way, the format-pattern determining unit 240 sets a TPI and a BPI commonly to all the heads. Thus, it is possible to set a disk use area corresponding to a different positioning accuracy of each of the heads without following a complicated procedure.

Even when an innermost area position and an outermost area position of each of the heads are determined such that a width in a radial direction of a disk use area is equal in all the heads, if the innermost area position (or the outermost area position) is different between the respective heads, an area of the disk use area is different between the respective heads. Therefore, an area of a disk use area may be varied for each of the heads instead of varying a width in a radial direction of the disk use area for each of the heads.

As described above, according to the third embodiment, an area or a width in a radial direction of an effective area (a disk use area) set to be capable of recording data in a recording area of at least one recording surface is different from areas or widths in a radial direction of effective areas set to be capable of recording data in recording areas of the other recording surfaces. Thus, it is possible to use appropriate areas as effective areas used for recording of data according to head positioning accuracies that are different between respective heads and improve a recording quality.

Moreover, according to the third embodiment, the effective area is determined based on positioning accuracies of heads that perform readout or writing of data. Thus, it is possible to obtain, in all the heads, a satisfactory positioning accuracy equal to or higher than a fixed level in the entire effective area and improve a recording quality.

Furthermore, according to the third embodiment, the effective area is divided into a plurality of zones and a TPI and a BPI in at least one of the zones are set to be different from those in other zones. Thus, it is possible to set an appropriate recording density corresponding to a head positioning accuracy that changes depending on a place of a disk and improve a recording quality.

Moreover, according to the third embodiment, an area near a boundary on the inner side and an area near a boundary on the outer side of the effective area are divided into a plurality of zones and a TPI and a BPI in at least one of the zones are set to be different from those in the other zones. Thus, it is possible to reduce a difference of positioning accuracies between the heads in areas where the difference is marked and efficiently improve a recording quality by limiting areas in which a recording density is variable to a part of the areas.

Furthermore, according to the third embodiment, a TPI and a BPI are determined for each of the recording surfaces according to boundaries on the inner side and the outer side in each of the effective areas. Thus, there is an effect that it is possible to set a recording density corresponding to a different positioning accuracy of each of the heads without following a complicated procedure.

Moreover, according to the third embodiment, a TPI and a BPI in each of the effective areas are set to be identical on all the recording surfaces. Thus, it is possible to set a recording area according to a different positioning accuracy of each of the heads without following a complicated procedure.

Furthermore, according to the third embodiment, the positioning-accuracy measuring unit 210 measures a positioning accuracy of each of the heads that the disk device has for each of the recording surfaces. The boundary determining unit 220 determines an effective area for each of the heads based on a result of the measurement of a positioning accuracy. The format-execution control unit 250 executes, for the effective area determined for each of the heads, formatting of the recording surface corresponding to each of the heads. Thus, it is possible to obtain, in all the heads, a satisfactory positioning accuracy equal to or higher than a fixed level in the entire effective area and improve a recording quality.

Moreover, according to the third embodiment, the format-pattern determining unit 240 divides an effective area determined for each of the heads into a plurality of zones and determines a TPI and a BPI in at least one of the zones to be different from those in the other zones. The format-execution control unit 250 executes formatting of the recording surface corresponding to each of the heads based on the TPI and the BPI for each of the heads determined. Thus, it is possible to set an appropriate recording density corresponding to a head positioning accuracy that changes depending on a place of a disk and improve a recording quality.

Furthermore, according to the third embodiment, the format-pattern determining unit 240 divides an area near a boundary on the inner side and an area near a boundary on the outer side of the effective area determined for each of the heads into a plurality of zones and determines a TPI and a BPI in at least one of the zones to be different from those in the other zones. The format-execution control unit 250 executes formatting of the recording surface corresponding to each of the heads based on the TPI and the BPI for each of the heads determined. Thus, it is possible to reduce a difference of positioning accuracies between the heads in areas where the difference is marked and efficiently improve a recording quality by limiting areas in which a recording density is variable to a part of the areas.

Moreover, according to the third embodiment, the format-pattern determining unit 240 determines a TPI and a BPI for each of the recording surfaces according to a boundary on the inner side and a boundary on the outer side in each of the effective areas. The format-execution control unit 250 executes formatting of the recording surface corresponding to each of the heads based on the TPI and the BPI for each of the heads determined. Thus, it is possible to set a recording density corresponding to a different positioning accuracy of each of the heads without following a complicated procedure.

According to the first to the third embodiments, the present invention is applied to the magnetic disk device. However, the present invention is not limited to this. It is possible to apply the present invention to other disk devices like an optical disk device in the same manner.

According to an embodiment of the present invention, an area or a width in a radial direction of an effective area set to be capable of recording data in a recording area of at least one recording surface is different from areas or widths in a radial direction of effective areas set to be capable of recording data in recording areas of the other recording surfaces. Thus, there is an effect that it is possible to use appropriate areas as effective areas used for recording of data according to head positioning accuracies that are different between respective heads and improve a recording quality.

Moreover, according to an embodiment of the present invention, the effective area is determined based on positioning accuracies of heads that perform readout or writing of data. Thus, there is an effect that it is possible to obtain, in all the heads, a satisfactory positioning accuracy equal to or higher than a fixed level in the entire effective area and improve a recording quality.

Furthermore, according to an embodiment of the present invention, the effective area is divided into a plurality of zones and a recording density in at least one of the zones is set to be different from those in the other zones. Thus, there is an effect that it is possible to set an appropriate recording density corresponding to a head positioning accuracy that changes depending on a place of a disk and improve a recording quality.

Moreover, according to an embodiment of the present invention, at least one of an area near a boundary on the inner side and an area near a boundary on the outer side of the effective area is divided into a plurality of zones and a recording density in at least one of the zones is set to be different from those in the other zones. Thus, there is an effect that it is possible to reduce a difference of positioning accuracies between the heads in areas where the difference is marked and efficiently improve a recording quality by limiting areas in which a recording density is variable to a part of the areas.

Furthermore, according to an embodiment of the present invention, a recording density is determined for each of the recording surfaces according to any one of a boundary on the inner side and a boundary on the outer side or both in each of the effective areas. Thus, there is an effect that it is possible to set a recording density corresponding to a different positioning accuracy of each of the heads without following a complicated procedure.

Moreover, according to an embodiment of the present invention, a recording density in each of the effective areas is determined to be identical on all the recording surfaces. Thus, there is an effect that it is possible to set an effective area corresponding to a different positioning accuracy of each of the heads without following a complicated procedure.

Furthermore, according to an embodiment of the present invention, a positioning accuracy of each of the heads that the disk device has for each of the recording surfaces is measured, an effective area used for recording of data is determined for each of the heads based on a result of the measurement of a positioning accuracy, and formatting of the recording surface corresponding to each of the heads is executed for the effective area determined for each of the heads. Thus, there is an effect that it is possible to obtain, in all the heads, a satisfactory positioning accuracy equal to or higher than a fixed level in the entire effective area and improve a recording quality.

Moreover, according to an embodiment of the present invention, the effective area determined for each of the heads is divided into a plurality of zones, a recording density in at least one of the zones is determined to be different from those in the other zones, and formatting of the recording surface corresponding to each of the heads is executed based on the recording density for each of the heads determined. Thus, there is an effect that it is possible to set an appropriate recording density corresponding to a head positioning accuracy that changes depending on a place of a disk and improve a recording quality.

Furthermore, according to an embodiment of the present invention, at least one of an area near a boundary on the inner side and an area near a boundary on the outer side of the effective area determined for each of the heads is divided into a plurality of zones, a recording density in at least one of the zones is determined to be different from those in the other zones, and formatting of the recording surface corresponding to each of the heads is executed based on the recording density for each of the heads determined. Thus, there is an effect that it is possible to reduce a difference of positioning accuracies between the heads in areas where the difference is marked and efficiently improve a recording quality by limiting areas in which a recording density is variable to a part of the areas.

Moreover, according to an embodiment of,the present invention, a recording density is determined for each of the recording surfaces according to any one of a boundary on the inner side and a boundary on the outer side or both in each of the effective areas and formatting of the recording surface corresponding to each of the heads is executed based on the recording density for each of the heads determined. Thus, there is an effect that it is possible to set a recording density corresponding to a different positioning accuracy of each of the heads without following a complicated procedure.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A disk device comprising:
    a plurality of recording surfaces each of which having a recording area for recording data, and
    a plurality of heads each of which performing reading or writing of the data on each of the recording surfaces, wherein
    each of the recording areas has an effective area which is set to be capable of recording the data and determined based on a positioning accuracy of each of the heads, and
    an area or a width in a radial direction of at least one of the effective areas being different from that of other effective areas.

2. The disk device according to claim 1, wherein
    the effective area is divided into a plurality of zones, and
    a recording density of at least one of the zones is set to be different from that of other of the zones.

3. The disk device according to claim 1, wherein
    at least one of a first area near an inner-side boundary and a second area near an outer-side boundary from among the effective areas is divided into a plurality of zones, and
    a recording density of at least one of the zones is set to be different from those of other of the zones.

4. The disk device according to claim 1, wherein
    a recording density is determined for each of the recording surfaces based on at least one of an inner-side boundary and an outer-side boundary in each of the effective areas.

5. The disk device according to claim 1, wherein
    a recording density of each of the effective areas is set to be identical on all of the recording surfaces.

6. A disk formatting method for a disk device including a plurality of recording surfaces each of which having a recording area for recording data and a plurality of heads that performs reading or writing of the data on the recording surfaces, the disk formatting method comprising:
    measuring a positioning accuracy of each of the heads for each of the recording surfaces;
    determining an effective area for recording the data for each of the heads based on a result of measurement of the positioning accuracy at the measuring; and
    executing formatting of a recording surface corresponding to each of the heads for the effective area determined for each of the heads.

7. A disk formatting apparatus for a disk device including a plurality of recording surfaces each of which having a recording area for recording data and a plurality of heads that performs reading or writing of the data on the recording surfaces, the disk formatting apparatus comprising:
    a positioning-accuracy measuring unit that measures a positioning accuracy of each of the heads for each of the recording surfaces;
    an effective-area determining unit that determines an effective area for recording the data for each of the heads based on a result of measurement of the positioning accuracy by the positioning-accuracy measuring unit; and a format executing unit that executes formatting of a recording surface corresponding to each of the heads for the effective area determined for each of the heads.

8. The disk formatting apparatus according to claim 7, further comprising:

a format-pattern determining unit that divides the effective area determined for each of the heads into a plurality of zones, and determines a recording density of at least one of the zones to be different from that of other of the zones, wherein the format executing unit executes the formatting of the recording surface corresponding to each of the heads based on the recording density determined for each of the heads.

9. The disk formatting apparatus according to claim 7, further comprising:

a format pattern determining that divides at least one of a first area near an inner-side boundary and a second area near an outer-side boundary from among the effective areas determined for each of the heads into a plurality of zones, and determines a recording density of at least one of the zones to be different from that of other of the zones, wherein the format executing unit executes the formatting of the recording surface corresponding to each of the heads based on the recording density determined for each of the heads.

10. The disk formatting apparatus according to claim 7, further comprising:

a format-pattern determining unit that determines a recording density for each of the recording surfaces based on at least one of an inner-side boundary and an outer-side boundary in each of the effective areas, wherein the format executing unit executes the formatting of the recording surface corresponding to each of the heads based on the recording density determined for each of the heads.

11. The disk formatting apparatus according to claim 7, wherein the format executing unit sets a recording density of each of the effective areas to be identical on all of the recording surfaces.

* * * * *